Aug. 20, 1940.    M. H. JOSEPH    2,211,978
HOSE COUPLING
Filed Dec. 5, 1938
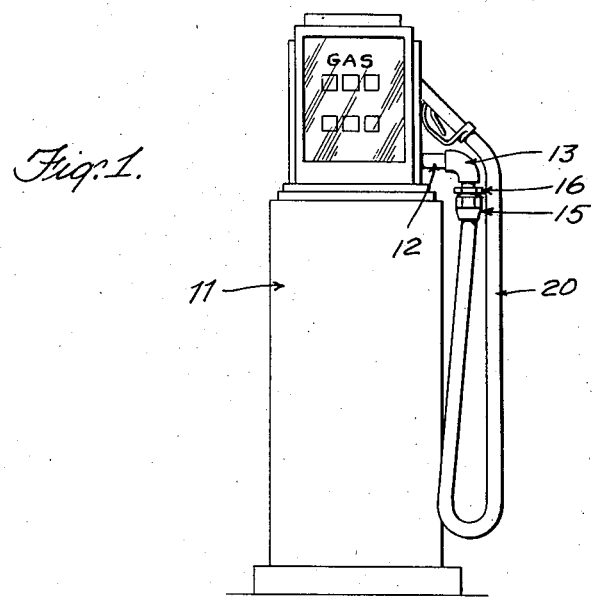
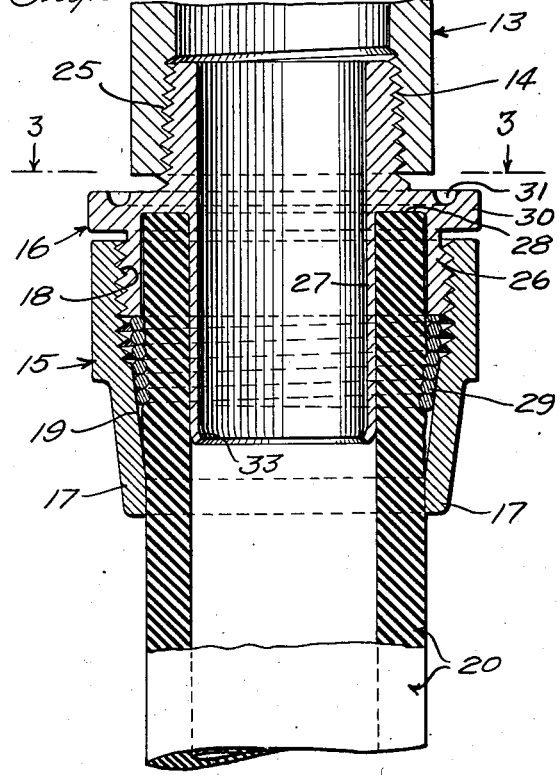
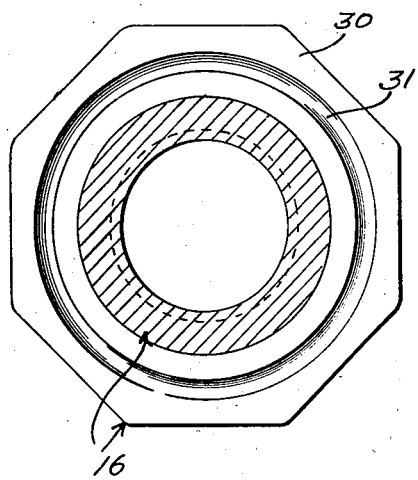
INVENTOR
MOSES HENRY JOSEPH
BY
Moses & Nolte
ATTORNEYS Patented Aug. 20, 1940

2,211,978

UNITED STATES PATENT OFFICE 2,211,978

HOSE COUPLING

Moses Henry Joseph, Woodmere, N. Y., assignor to United Metal Hose Company, Inc., Long Island City, N. Y., a corporation of New York Application December 5, 1938, Serial No. 243,946

4 Claims. (Cl. 285—86)

This invention relates to improvements in coupling members for hose, and more particularly relates to coupling members to be applied to flexible hose, for example, of the type used on liquid fuel dispensing pumps. The coupling member may also be applied to flexible metal hose, both with and without outer or inner coverings of fabric, rubber or the like, and is especially adapted for the type of flexible hose having an outside cover of rubber or any compound affected by liquid being conveyed.

Various types of couplings for hose have heretofore been proposed, which are said to be particularly adapted to fuel-dispensing hose consisting of various means which supply a substantially liquid-tight joint between the hose and the coupling member. These heretofore proposed coupling members have suffered under numerous disadvantages, in that in many cases they are not adapted for use with flexible hose, so that the useful life of the hose is considerably shortened by the damage done by application of the coupling member. Further disadvantage has existed in previously proposed coupling members for flexible hose in that insufficient provision is made for avoiding the damage caused by thread seepage or the like at the point where the hose is connected to the gasoline pump.

It is an object of this invention to provide a substantially tight hose coupling which does not involve any damaging wear and tear on the end of the hose engaged and which makes provision for removal of the danger from possible seepage of the fuel or other liquid at the point of connection of the hose to the source of liquid. Such provision is necessary, since the liquid delivered in such hose very often has a damaging effect on the outside wall of the hose if it comes in contact therewith.

It is a further object of this invention to provide a hose coupling which shall have an internal supporting sleeve integral with the coupling member which prevents the collapse of the hose at the engaging point of the coupling.

In the accompanying drawing forming a part of this specification, wherein I have shown a preferred embodiment of my invention for the purpose of illustrating the principles thereof, Fig. 1 is a side view of a conventional fuel delivery pump for internal combustion engine fuels, showing the manner in which the delivery hose is attached;

Fig. 2 is a longitudinal sectional view showing the coupling member applied to the hose and attached to the delivery nozzle; and Fig. 3 is a cross section on line 3—3 of Fig. 2.

Referring to the drawing, in Fig. 1 is shown a gasoline pump 11 having a delivery outlet 12 leading to an elbow 13 having threads 14, to which the coupling member may be screwed.

For purposes of illustration the invention is shown as applied to a coupling of the type disclosed in Levitt Patent No. 1,637,701, but other types of coupling may be used. The coupling member in its preferred form includes an outer sleeve 15 and a coupling nut 16. The outer end of the bore of the sleeve is provided with a hose-engaging portion 17 and the inner end thereof, which is of greater diameter than the outer end, is provided with an internal thread 18. Intermediate its inner and outer portions the bore is provided with a tapered portion 19 adapted to receive and engage the gripping member hereinafter described.

The coupling nut 16 is preferably provided at its outer end with a threaded portion 25, which may be adapted to connect with any desired duct member, nozzle or the like, and is here shown as being attached to the delivery member 13 of the pump 11. As shown the portion 25 is externally threaded and screws into an internally threaded portion of the member 13, but obviously any other suitable form of connection may be used. The nut 16 is provided with outer and inner sleeves 26 and 27, the outer sleeve being externally threaded, and the inner sleeve being preferably of greater length than the outer sleeve. The two sleeves are so spaced that the end of the hose is adapted to be inserted therebetween with relative snugness, abutting against the shoulder 28, which is preferably integral with the two sleeve portions, joining them together.

The coupling further includes a gripping member 29 comprising a helical coil formed of wire, the inner diameter of the coil being substantially equal to the outer diameter of the hose to which the coupling is to be applied. The gripping member which is preferably, but not necessarily, formed of spring wire may be formed before being applied to the hose, or it may be applied to the hose by coiling the wire thereon, but in either case the direction of the coils should correspond to the direction of the threads formed on the inner ends of the sleeve and of the coupling nut so that when the coupling nut is tightened up, the wire will tend to be more tightly coiled upon the pipe.

The coupling nut 16 also comprises between the hose-engaging and nozzle-engaging portions a portion 30 having a diameter which may preferably be equal to or greater than the remaining portions of the coupling member when applied. As shown in Fig. 3, this portion may suitably take the form of a polygon for purposes of ease of application of the coupling member to the hose or the delivery nozzle.

Particularly when the coupling member is used for the purpose of attaching a flexible hose to a delivery pump for liquid fuels, it is desirable to make provision for keeping possible seepage from the joint between the coupling and pump from coming in contact with the outside wall of the hose. This necessity arises from the fact that the volatile type petroleum fuels which are commonly used peptize the rubber or other covering of the hose with comparative ease, and were this condition allowed to persist, the useful life of the hose would be considerably shortened. Even though the coupling is apparently tightly screwed to the pump connection it has been found that a small amount of seepage is likely to take place through the threads of the screw joint.

I have discovered that by making provision for a zone of evaporation of this small seepage, I can prevent the damage to the outside wall of the hose and thus increase the life of the entire unit. Any suitable provision for a zone of evaporation which is adapted to entrap the small amount of fuel seeping between the threaded portions 14 and 25 or between a similar attachment, may be used. My preferred form, however, comprises an annular trough or depression 31 formed in the upper surface of the shoulder portion 30. When the threads 14 and 25 are machined with reasonable care, only a small amount of fuel will seep through onto the shoulder 30, and this will be entrapped in the trough 31, where, due to the volatility of the fuel, it will evaporate before it is able to flow over the shoulder 30 and thus down the outside wall of the sleeve 15 onto the hose 20. By these means I am able to prevent the destruction of the hose by the peptizing effect of the seeping fuel. This feature of my invention relating to the provision of an evaporation reservoir is obviously applicable to any type of hose coupling, the form shown being merely illustrative.

As heretofore explained, a coupling nut is provided with an inner metallic sleeve 27, which is formed integral with the nut and preferably formed so as to be inserted into the hose beyond the engaging point of the gripping member 29, when the coupling is assembled, thus providing a rigid support within the flexible hose at the point where greatest pressure is applied to its walls, and providing, further, additional insurance against leakage of the liquid contained in the hose around the end of the hose and through the portion engaged by the gripping member. I have found that distinct advantages arise from forming the coupling nut and sleeve 27 integral therewith, in that no matter how long the hose couplings may be used or to what rough use it may be put, no leakage can possibly occur around the inner sleeve as would occur in the case of a thimble or the like inserted in the coupling nut and the hose for the purpose of support. For ease in application, I have found it preferable to round off the walls of the sleeve 27 at its lower extremity 33.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In combination, a liquid delivery pump having a delivery outlet; a hose, and a hose coupling unit connecting said hose to said outlet, said unit comprising a hose-gripping zone, a pump-connecting zone, and an evaporation zone intermediate the two first-mentioned zones, said evaporation zone having located therein a reservoir wherein any liquid escaping through said pump-connecting zone will flow and evaporate before reaching the outer wall of said hose.

2. The combination as claimed in claim 1, wherein the evaporating zone comprises a circumferential laterally-extending portion, and an annular groove formed therein adapted to entrap any seepage of fluid escaping from said pump-connecting zone.

3. In a hose coupling, a coupling nut comprising an integral member, having on the inner side thereof a pair of sleeves between which a hose may be inserted, a circumferential laterally extending portion forming between the sleeves an annular shoulder and externally of the shoulder an engaging nut, and on the outer side thereof a threaded connecting portion, means located on the outer lateral surface of said engaging nut for entrapping seeping fluid, said means comprising an annular trough in said surface.

4. A coupling member for flexible hose including a hose gripping zone, a zone for connecting to a delivery outlet and means situated between said zones for entrapping seepage fluid, said means including a reservoir wherein seepage fluid is harmlessly evaporated.

MOSES HENRY JOSEPH.